(12) United States Patent
Belz

(10) Patent No.: US 9,020,202 B2
(45) Date of Patent: Apr. 28, 2015

(54) METHOD FOR FINDING DISTANCE INFORMATION FROM A LINEAR SENSOR ARRAY

(71) Applicant: Masco Corporation, Taylor, MI (US)

(72) Inventor: Jeffrey John Belz, Sterling Heights, MI (US)

(73) Assignee: Masco Canada Limited, St. Thomas (CA)

(*) Notice: Subject to any disclaimer, the term of this patent is extended or adjusted under 35 U.S.C. 154(b) by 124 days.

(21) Appl. No.: 13/708,944

(22) Filed: Dec. 8, 2012

(65) Prior Publication Data

US 2014/0161321 A1     Jun. 12, 2014

(51) Int. Cl.
*G06T 7/00* (2006.01)
*G01B 11/02* (2006.01)
*E03C 1/05* (2006.01)

(52) U.S. Cl.
CPC .............. *G01B 11/026* (2013.01); *E03C 1/057* (2013.01)

(58) Field of Classification Search
None
See application file for complete search history.

(56) References Cited

U.S. PATENT DOCUMENTS

| | | | |
|---|---|---|---|
| 6,250,601 B1 * | 6/2001 | Kolar et al. | 251/129.04 |
| 6,507,417 B1 * | 1/2003 | Makihira et al. | 358/486 |
| 7,124,312 B2 | 10/2006 | Casebolt et al. | |
| 7,221,486 B2 * | 5/2007 | Makihira et al. | 358/486 |
| 7,230,685 B2 * | 6/2007 | Suzuki et al. | 356/4.04 |
| 7,232,111 B2 * | 6/2007 | McDaniel et al. | 251/129.04 |
| 7,561,188 B2 * | 7/2009 | Kondo et al. | 348/222.1 |
| 7,668,391 B2 * | 2/2010 | Nonaka et al. | 382/260 |
| 8,026,951 B2 * | 9/2011 | Kondo et al. | 348/222.1 |
| 2002/0007510 A1 | 1/2002 | Mann | |
| 2006/0037467 A1 * | 2/2006 | McCarroll et al. | 91/361 |
| 2006/0140497 A1 * | 6/2006 | Kondo et al. | 382/254 |
| 2011/0315262 A1 * | 12/2011 | Butler et al. | 138/109 |
| 2012/0013887 A1 | 1/2012 | Xu et al. | |
| 2012/0097874 A1 | 4/2012 | Rodenbeck et al. | |

OTHER PUBLICATIONS

International Search Report and Written Opinion for International Application No. PCT/US2013/069396 dated Feb. 13, 2014.

* cited by examiner

*Primary Examiner* — Tsung-Yin Tsai
(74) *Attorney, Agent, or Firm* — Carlson, Gaskey & Olds, P.C.

(57) ABSTRACT

A method for determining a position using digital pixel data includes receiving pixel data from a position sensor device at a controller, sorting the received pixel data into pixel banks using the controller, identifying a maximum bank, a close bank, and a far bank using the controller, calculating a close to max ratio using a first equation and a max to far ratio using a second equation using the controller, and determining a position based on said close to max ratio and said far to max ratio.

19 Claims, 3 Drawing Sheets

| BANK | BASE NUMBER | BANK | BASE NUMBER | BANK | BASE NUMBER | BANK | BASE NUMBER |
|---|---|---|---|---|---|---|---|
| 0 | 1650 | 4 | 1250 | 8 | 850 | 12 | 450 |
| 1 | 1550 | 5 | 1150 | 9 | 750 | 13 | 350 |
| 2 | 1450 | 6 | 1050 | 10 | 650 | 14 | 250 |
| 3 | 1350 | 7 | 950 | 11 | 550 | 15 | 150 |

METHOD FOR FINDING DISTANCE INFORMATION FROM A LINEAR SENSOR ARRAY

BACKGROUND

The present disclosure is related generally to position sensing devices, and more specifically to a position sensing device for an automatic plumbing fixture.

Position sensing automated devices, such as automatic faucets or drinking fountains, utilize position sensors built into the structure of the faucet to determine the position of a user relative to the metal fixture of the faucet. When the user is closer than a certain distance, the faucet activates and begins dispensing water. Similar arrangements are also utilized in drinking fountains and other plumbing fixtures.

A common type of position sensing device used in these arrangements is a capacitive based sensor. The capacitive based sensor detects a capacitance between the metal fixture of the faucet and the person approaching or leaving the fixture. The strength of the capacitance varies depending on the distance between the person and the fixture according to known principles. In this way, a capacitance probe contacting the fixture can sense the capacitance and determine the position of the person.

SUMMARY

Disclosed is a method for determining a position using digital pixel data that includes receiving pixel data from a position sensor device at a controller, sorting the received pixel data into pixel banks using the controller, identifying a maximum bank, a close bank, and a far bank using the controller, calculating a close to max ratio using a first equation and a max to far ratio using a second equation using the controller, and determining a position based on said close to max ratio and said far to max ratio.

Also disclosed is a method for controlling an automated plumbing fixture that includes the steps of: using a linear sensor array to determine multiple potential positions of a user, determining an actual position of the user based on the multiple potential positions of the user using a controller, and outputting instructions from the controller to a plumbing fixture, thereby causing the plumbing fixture to perform a predetermined function based on the determined actual position.

These and other features of this application will be best understood from the following specification and drawings, the following of which is a brief description.

DETAILED DESCRIPTION

Figure 1:
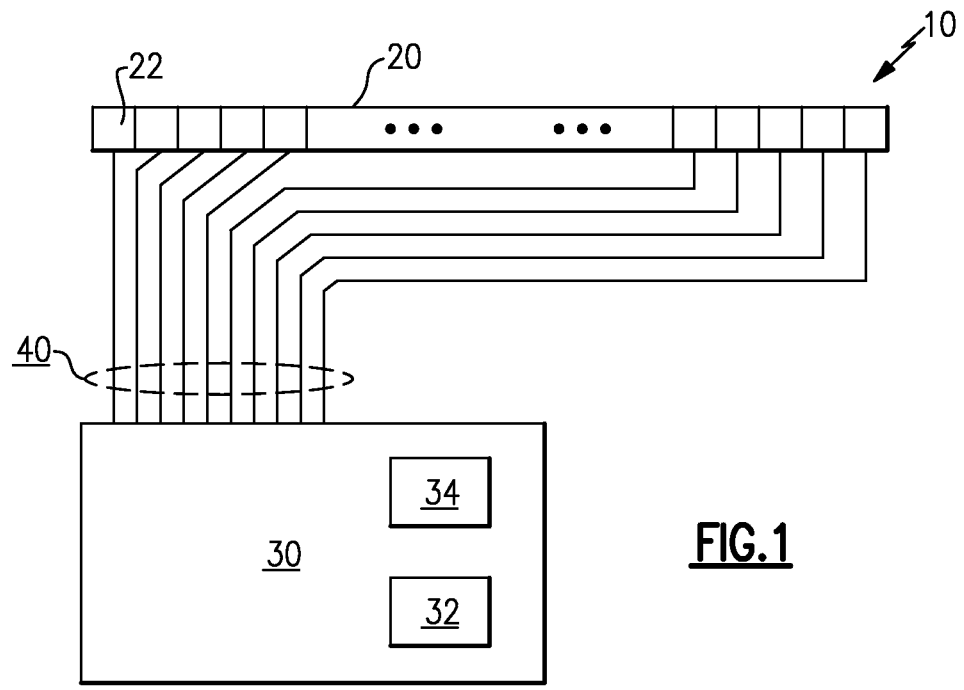
FIG. 1 schematically illustrates a position sensing device including a linear sensor array.

FIG. 1 illustrates a position sensing device (PSD) 10 for use in an automated faucet arrangement. The PSD 10 includes a linear sensor array 20 with multiple individual Infrared sensors 22. Each individual infrared sensor 22 is referred to as a pixel 22 and provides a single IR light measurement corresponding to the distance between a user and the faucet. Each pixel 22 of the linear sensor array 20 is connected to a controller 30 via a digital communication line 40. The controller 30 includes a processor 32 that processes incoming data from the pixels 22. The controller 30 also includes a memory 34 that stores the pixel data as well as data derived from the pixel data by the processor. The controller 30 can utilize the derived distance data to turn a faucet, such as a sink or a drinking fountain, on or off as necessary.

The controller 30 uses a process described below to aggregate the data from each pixel 22 of the linear sensor array 20 and to determine an actual position of the person approaching or leaving the faucet based on the data. The actual position is compared to a threshold position, and the faucet is activated when the person is closer to the faucet than the threshold distance. In alternate configurations, the controller memory 34 stores the derived locations and the controller 30 compares a current location to a previous location and determine if a user is approaching or leaving the faucet, and the faucet is activated based upon this determination.

Figure 2:
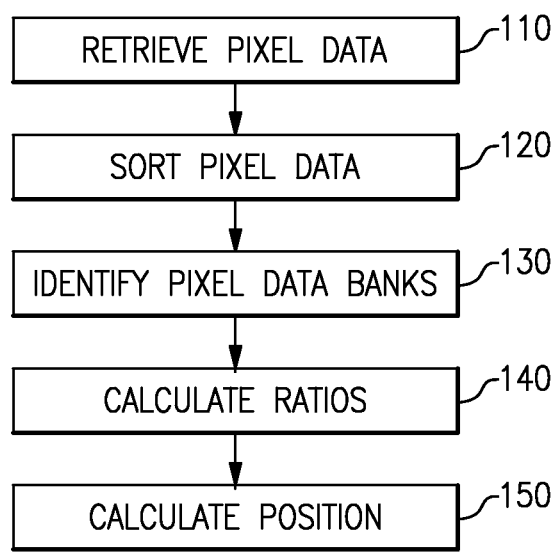
FIG. 2 illustrates a flow chart of a process by which the position sensing device of FIG. 1 determines a position.

FIG. 2 illustrates a process by which the processor 32 and the memory 34 of the controller 30 of FIG. 1 convert data from the individual pixels 22 into an actual position of the user. Initially, the individual pixel data is retrieved from the pixels 22 over the digital communication lines 40 in a "Retrieve Pixel Data" step 110. In one example, the linear sensor array 20 periodically transmits pixel data to the controller 30. In an alternate example, the linear sensor array 20 continuously monitors the capacitance, and therefore the distance, and the controller 30 polls the linear sensor array 20 to retrieve the pixel data as necessary.

Once the pixel data is retrieved, the processor 32 sorts the pixel data in a "Sort Pixel Data" step 120. Each pixel 22 is part of a grouping of pixels referred to as a pixel bank. Each pixel bank has the same number of pixels 22, and all the pixels 22 in a given bank are arranged consecutively on the linear sensor array 20. The controller 30 determines an average pixel value for each bank and stores that value in the memory 34.

Once the pixel data is fully sorted, the controller 30 identifies a maximum bank, a close bank, and a far bank in an "Identify Pixel Data Banks" step 130. The maximum bank is determined to be the pixel bank with the highest average distance value. The close bank is the pixel bank immediately sequentially prior to the maximum bank on the linear sensor array 20. The far bank is the pixel bank immediately sequentially after the maximum bank on the linear sensor array 20.

Once each pixel bank is identified, the processor 32 calculates a close to max to ratio using the close bank value and the maximum bank value and a max to far ratio using the far bank value and the maximum bank value in a "Calculate Ratios" step 140. Once the ratios are calculated, the processor 32 moves to a "Calculate Position" step 150.

In the "Calculate Position" step 150, the controller 30 determines that the position of the user is equal to a base number minus the close to max ratio plus the max to far ratio using P=B−CM+MF where P is the position, B is the base number, CM is the close to max ratio and MF is the max to far ratio. The base number used in this calculation is a preloaded constant stored in the memory 34 of the controller 30 and corresponds to the maximum bank. Once the position data has been determined, the controller 30 performs any required corresponding action according to the programmed control scheme.

Figures 3, 4:
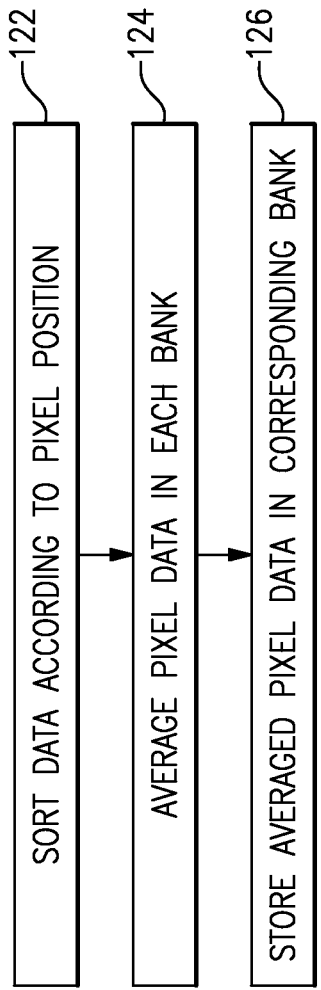
FIG. 3 illustrates an example table for utilization in the process of FIG. 2.
FIG. 4 illustrates a flow chart of a sub-process performed within a sort pixel data step of FIG. 2.

In some examples, the base numbers are stored in a table, such as the example table illustrated in FIG. 3. Each pixel bank 202 in the table has a base number 204 assigned to the pixel bank 202. The base number 204 for the position calculation described above is the base number 204 corresponding to the maximum bank 202 determined in the "Identify Pixel Data Banks" step 130. Thus, in the example of FIG. 3, if pixel bank 8 is determined to have the maximum value in the "Identify Pixel Data Banks" step 130, the base number utilized in the position calculation is 850. The values listed in the sample table of FIG. 3 are exemplary only, and practical implementations will utilize different base values 204 and different numbers of pixel banks 202.

FIG. 4 illustrates the process of the "Sort Pixel Data" Step 120 in greater detail. Initially, in the Sort Pixel Data Step 120, the controller 30 sorts the pixel data into the pixel banks according to the physical pixel position on the linear sensor array 20 in a "Sort Data According to Pixel Position" step 122. Each pixel bank contains the same number of pixels as each other pixel bank, and all the pixels within a single bank are sequentially adjacent along the linear sensor array 20. Once each pixel is sorted into the correct pixel bank, the pixel data in each bank is averaged to determine a bank value in an "Average Pixel Data in Each Bank" step 124. The bank values are then correlated with their corresponding pixel bank and stored in the controller memory 34 in a "Store Average Pixel Data in Corresponding Bank" step 126, and the controller 30 moves to the "Identify Pixel Data Banks" step 130 of FIG. 3.

Figure 5:
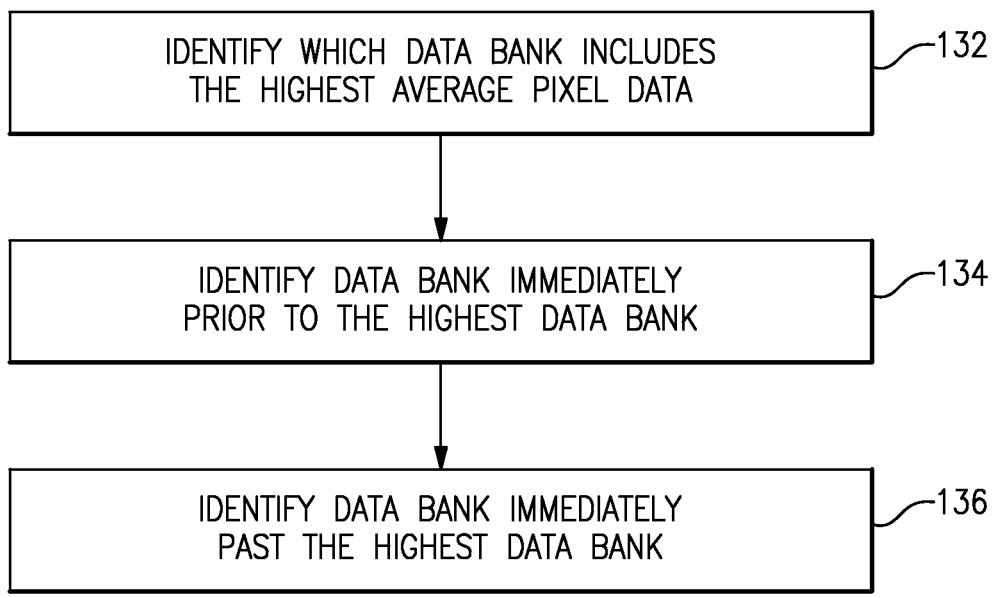
FIG. 5 illustrates a flow chart of a sub-process performed within the identified pixel data banks step of FIG. 2.

FIG. 5 illustrates the process of the "Identify Pixel Data Banks" step 130 in greater detail. Initially, the controller 30 compares the bank values of all the pixel banks and determines which pixel bank has the highest value in an "Identify Which Data Bank Includes the Highest Average Pixel Data" step 132. The controller 30 then determines the pixel bank immediately sequentially prior to the maximum pixel bank and labels the determined bank the close pixel bank in an "Identify Data Bank Immediately Prior to the Highest Data Bank" step 134. The controller 30 then determines the pixel bank immediately sequentially after the maximum bank and labels the determined bank the far pixel bank in an "Identify Data Bank Immediately After the Highest Data Bank" step 136.

Figure 6:
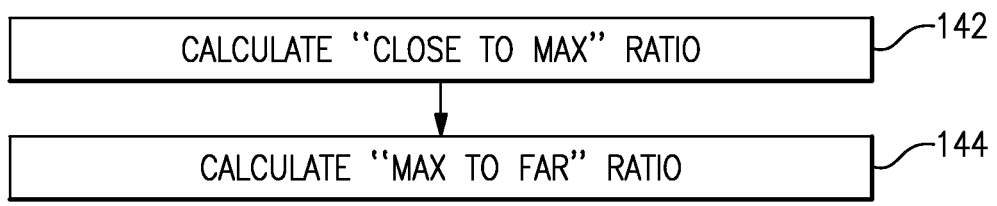
FIG. 6 illustrates a flow chart of a sub-process performed in the calculate ratios step of the process of FIG. 2.

Once all the data banks are identified, the controller 30 moves to the "Calculate Ratios" step 140, illustrated in greater detail in FIG. 6. During the "Calculate Ratios" step 140, the controller 30 determines a close to max ratio in a "Calculate Close to Max Ratio" step 142. The close to max ratio is $CM=((MV-CBV)/(MV+CBV))*100$, where CM is the close to max ratio, MV is the value of the maximum bank and CBV is the value of the close bank. Similarly, the controller 30 determines a max to far ratio in a "Calculate Max to Far Ratio" step 144. The max to far ratio is $MF=((MV-FBV)/(MV+FBV))*100$, where MF is the max to far ratio, MV is the value of the maximum bank and FBV is the value of the far bank. The close to max ratio and the max to far ratio are then utilized in the "Calculate Position" step 150 described above with regards to FIG. 2.

While the above described processes and sub-processes indicate in order by which the steps are taken by the processor, it is understood that steps not dependent on the results of a previous step can be performed in alternate orders and still fall within the present disclosure.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for determining a position using digital pixel data comprising
   receiving pixel data from a linear sensor array at a controller;
   sorting the received pixel data into pixel banks using the controller;
   identifying a maximum bank, a close bank, and a far bank using the controller, wherein the maximum bank is determined to be the pixel bank with a highest average distance value, the close bank is the pixel bank immediately sequentially prior to the maximum bank on a linear sensor array, and the far bank is the pixel bank immediately sequentially after the maximum bank on the linear sensor array;
   calculating a close bank to maximum bank ratio using a first equation and a maximum bank to far bank ratio using a second equation using the controller; and
   determining a position based on said close to max ratio and said far to max ratio.

2. The method of claim 1, wherein said close bank to maximum bank ratio is ((maximum bank value−close bank value)/(maximum bank value+close bank value))*100.

3. The method of claim 2, wherein said maximum bank to far bank ratio is (maximum bank value−far bank value)/(maximum bank value+far bank value)*100.

4. The method of claim 3 wherein said step of determining a position based on said close bank to maximum bank ratio and said far bank to maximum bank ratio comprises subtracting said close bank to maximum bank ratio from said maximum bank value to determine an intermediate value and adding the maximum bank to far bank ratio to said intermediate value to determine an actual position.

5. The method of claim 1, wherein said step of receiving pixel data from the position sensor device comprises receiving the digital input using a digital input connection of the controller, wherein said digital input comprises a plurality of pixel values.

6. The method of claim 1, wherein said step of sorting the received pixel data into pixel banks comprises averaging a pixel value of each pixel in the pixel bank, and thereby determining a bank value for each pixel bank.

7. The method of claim 1, wherein said step of identifying the maximum bank comprises
   identifying the pixel bank having the highest value of all the pixel banks as the maximum bank.

8. The method of claim 7, wherein said step of identifying the close bank and the far bank comprises identifying a first bank immediately sequentially prior to said maximum bank on the linear sensor array as the close bank and identifying a second bank immediately sequentially after said maximum bank on the linear sensor array as a far bank.

9. The method of claim 1, wherein each datum of said received pixel data is a distance measurement from a distinct infrared (IR) sensor.

10. The method of claim 1, wherein each datum of said received pixel data is a distance measurement from a distinct infrared (IR) sensor.

11. The method of claim 1, wherein each pixel is a distinct infrared (IR) sensor within the linear sensor array.

12. A method for controlling an automated plumbing fixture comprising the steps of:
    using a linear sensor array to determine multiple potential positions of a user;

determining an actual position of the user based on the multiple potential positions of the user using a controller, wherein the multiple potential positions are measured by a linear sensor array by
    receiving pixel data from a position sensor device at a controller;
    sorting the received pixel data into pixel banks using the controller;
    identifying a maximum bank, a close bank, and a far bank using the controller, wherein the maximum bank is determined to be the pixel bank with a highest average distance value, the close bank is the pixel bank immediately sequentially prior to the maximum bank on a linear sensor array, and the far bank is the pixel bank immediately sequentially after the maximum bank on the linear sensor array;
    calculating a close bank to maximum bank ratio using a first equation and a maximum bank to far bank ratio using a second equation using the controller; and
    determining a position based on said close bank to maximum bank ratio and said far bank to maximum bank ratio; and
outputting instructions from said controller to a plumbing fixture thereby causing said plumbing fixture to perform a predetermined function based on the determined actual position.

13. The method of claim 12, wherein said close bank to maximum bank ratio is ((maximum bank value−close bank value)/(maximum bank value+close bank value))*100.

14. The method of claim 13, wherein said maximum bank to far bank ratio is (maximum bank value−far bank value)/(maximum bank value+far bank value)*100.

15. The method of claim 14 wherein said step of determining the position based on said close bank to maximum bank ratio and said far bank to maximum bank ratio comprises subtracting said close bank to maximum bank ratio from said maximum bank value to determine an intermediate value and adding the maximum bank to far bank ratio to said intermediate value to determine an actual position.

16. The method of claim 12, wherein said step of receiving pixel data from the linear sensory array comprises receiving a digital input using a digital input connection of a controller, wherein said digital input comprises a plurality of pixel values.

17. The method of claim 12, wherein said step of sorting the received pixel data into pixel banks comprises averaging a pixel value of each pixel in a pixel bank, and thereby determining a bank value for each pixel bank.

18. The method of claim 12, wherein said step of identifying a maximum bank comprises identifying a pixel bank having the highest value of all the pixel banks as the maximum bank.

19. The method of claim 18, wherein said step of identifying the close bank and the far bank comprises identifying a first bank immediately sequentially prior to said maximum bank on the linear sensor array as the close bank and identifying a second bank immediately sequentially after said maximum bank on the linear sensor array as the far bank.

\* \* \* \* \*